United States Patent
Brand et al.

(10) Patent No.: US 11,801,936 B2
(45) Date of Patent: Oct. 31, 2023

(54) PREVENTING HELICOPTER LOSS OF TAIL ROTOR EFFECTIVENESS

(71) Applicant: TEXTRON INNOVATIONS INC., Providence, RI (US)

(72) Inventors: Albert G Brand, North Richland Hills, TX (US); Bradley P. Regnier, Fort Worth, TX (US); Matthew J. Hill, Keller, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 290 days.

(21) Appl. No.: 17/151,718

(22) Filed: Jan. 19, 2021

(65) Prior Publication Data

US 2022/0227488 A1     Jul. 21, 2022

(51) Int. Cl.
| | |
|---|---|
| *B64C 27/78* | (2006.01) |
| *B64C 27/57* | (2006.01) |
| *B64C 27/68* | (2006.01) |
| *B64C 27/82* | (2006.01) |
| *B64D 45/00* | (2006.01) |
| *B64C 27/06* | (2006.01) |

(52) U.S. Cl.
CPC .............. *B64C 27/78* (2013.01); *B64C 27/06* (2013.01); *B64C 27/57* (2013.01); *B64C 27/82* (2013.01); *B64D 45/00* (2013.01); *B64C 2027/8209* (2013.01)

(58) Field of Classification Search
CPC ......... B64C 27/78; B64C 27/57; B64C 27/68; B64C 27/82; B64C 2027/8209; B64C 27/006; B64D 45/00
See application file for complete search history.

(56) References Cited

U.S. PATENT DOCUMENTS

| | | | |
|---|---|---|---|
| 6,607,161 B1 * | 8/2003 | Krysinski | ........... B64C 29/0033 244/7 C |
| 10,118,696 B1 * | 11/2018 | Hoffberg | ............... B64C 39/001 |
| 10,386,858 B2 * | 8/2019 | Bothwell | ............... B64C 27/82 |
| 11,312,480 B2 * | 4/2022 | Gillett | ................... B64D 35/04 |

(Continued)

FOREIGN PATENT DOCUMENTS

EP     3144637 A1     3/2017

OTHER PUBLICATIONS

Federal Aviation Administration Advisory Circular AC No. 90-95 Subject: Unanticipated Right Yaw in Helicopters (Year: 1995).*

(Continued)

*Primary Examiner* — Donald J Wallace
*Assistant Examiner* — Jalal C Coduroglu
(74) *Attorney, Agent, or Firm* — Fogarty LLP (57) ABSTRACT

Embodiments are directed to a flight control system for a helicopter comprises a pilot interface configured to receive a control input, at least one electronically controlled actuator, and a computing device configured to translate the control input to an actuator command, wherein the computing device is further configured to apply yaw rate limits to the actuator command to avoid loss of tail rotor effectiveness. The yaw rate limits are associated with a vortex ring state (VRS) envelope for a tail rotor of the helicopter. The electronically controlled actuator comprises a tail rotor actuator. The control input is a pedal input.

18 Claims, 5 Drawing Sheets

(56) References Cited

U.S. PATENT DOCUMENTS

| | | | | |
|---|---|---|---|---|
| 2004/0007644 | A1* | 1/2004 | Phelps, III | B64C 27/52 244/17.11 |
| 2013/0211634 | A1* | 8/2013 | Cherepinsky | G05D 1/0858 701/7 |
| 2013/0320133 | A1* | 12/2013 | Ratti | B64C 33/02 244/22 |
| 2013/0325221 | A1* | 12/2013 | Shue | G05D 1/0676 701/16 |
| 2014/0088800 | A1* | 3/2014 | Mercer | G01P 5/00 701/14 |
| 2015/0197335 | A1* | 7/2015 | Dekel | B64C 27/52 701/5 |
| 2017/0057658 | A1* | 3/2017 | Sabnis | G05D 1/00 |
| 2019/0352003 | A1* | 11/2019 | Mercer | B64C 13/18 |
| 2020/0023955 | A1* | 1/2020 | Worsham, II | G05D 1/0858 |
| 2020/0031490 | A1* | 1/2020 | Bothwell | B64D 45/0005 |
| 2021/0197962 | A1* | 7/2021 | Brand | B64C 27/04 |
| 2021/0232103 | A1* | 7/2021 | Hull | G02B 5/08 |
| 2021/0245871 | A1* | 8/2021 | Mercer | B64C 27/56 |
| 2022/0119008 | A1* | 4/2022 | Suissa | B60T 8/26 |
| 2022/0221864 | A1* | 7/2022 | Batten | G05D 1/0204 |
| 2022/0227488 | A1* | 7/2022 | Brand | B64D 45/00 |

OTHER PUBLICATIONS

Proc IMechE Part D: J Automobile Engineering Real-time yaw rate prediction based on a non-linear model and feedback compensation for vehicle dynamics control Hongjun Zhu1, LiangLi1, Maojing Jin2, HongzhiLi1 and Jian Song (Year: 2013).*

IEEE Control Systems Letters, vol. 4, No. 3, Jul. 2020 Torque Vectoring for High-Performance Electric Vehicles: An Efficient MPC Calibration Alberto Lucchini, Simone Formentin, Matteo Corno, Dario Piga, and Sergio M. Savaresi (Year: 2020).*

DoD HPCMP Users Group Conference 2008 Prediction of High-Amplitude Forces During Propeller Crashback Peter A. Chang, III* and Michael P. Ebert, Jeremy Shipman, Krishnan Mahesh (Year: 2008).*

U.S. Department of Transportation, Federal Aviation Administration, Advisory Circular, "Unanticipated Right Yaw in Helicopters," Dec. 26, 1995, 10 pages, publisher U.S. Department of Transportation, Federal Aviation Administration, Washington, D.C., U.S.A.

European Patent Office, "European Search Report," EP Application No. 21213987.7, Jun. 5, 2022, 5 pages, published Munich, Germany.

* cited by examiner

PREVENTING HELICOPTER LOSS OF TAIL ROTOR EFFECTIVENESS

BACKGROUND

In a conventional helicopter, Loss of Tail rotor Effectiveness (LTE) is an unanticipated high yaw rate in the direction of the advancing main rotor bade. LTE can be initiated with aggressive pedal input or if the helicopter experiences a strong tail wind, which tends to weathervane the helicopter. Once underway, the high yaw rate may result in a continued uncommanded high yaw rate that does not subside of its own accord. Thus, if not prevented by the pilot, LTE can result in the loss of aircraft control. LTE is a low-speed aerodynamic flight characteristic of helicopters and is not caused by a mechanical failure. On helicopters manufactured in the United States, the main rotor typically rotates in a counterclockwise direction when viewed from above. Torque produced by the engine is applied to the main rotor causing the main rotor to turn in one direction while the helicopter fuselage reaction torque is to rotate in the opposite direction (i.e., clockwise, or nose-right direction). On some helicopters manufactured in Europe and Russia, the main rotor rotates clockwise when viewed from above, which causes the fuselage to rotate in the counterclockwise or nose-left direction. During normal operations, the helicopter's anti-torque system, or tail rotor, provides thrust to counteract the fuselage reaction torque, which provides directional control while hovering. The continued uncommanded high yaw rate of LTE occurs when the flow of air through a tail rotor is altered due to the helicopter's yaw rate. LTE is a well-known phenomenon of single main rotor helicopters. Federal Aviation Administration (FAA) Advisory Circular AC 90-95 directs the pilot to anticipate conditions conducive to LTE and not allow a yaw rate to build.

SUMMARY

Embodiments are directed to systems and methods for incorporating an algorithm in a helicopter flight control system to limit the pilot's, or the aircraft's ability to achieve yaw rates that would cause LTE. A specific yaw rate limit is set on the helicopter to avoid LTE based on vortex ring state avoidance at a tail rotor. The LTE yaw rate limit is specified for a helicopter flight control system to alert the pilot and/or prevent the pilot or the aircraft from exceeding the limit.

In an example embodiment, a flight control system for a helicopter comprises a pilot interface configured to receive a control input, at least one electronically controlled actuator, and a computing device configured to translate the control input to an actuator command, wherein the computing device is further configured to apply yaw rate limits to the actuator command to avoid loss of tail rotor effectiveness. The yaw rate limits are associated with a vortex ring state (VRS) envelope for a tail rotor of the helicopter. The electronically controlled actuator comprises a tail rotor actuator. The control input is a pedal input or a main rotor collective input.

The flight control system may further comprise a memory device configured to store the yaw rate limits as a table indicating whether a set of yaw rates are acceptable across a set of speeds, gross weights, or atmospheric conditions, such as altitude, temperature, and wind speed.

The flight control system may further comprise an indicator configured to notify the pilot when a command, such as a pedal command or a main rotor collective command, is predicted to result in a yaw rate that exceeds a yaw rate limit.

The flight control system may further comprise an indicator configured to notify the pilot when a current helicopter yaw rate exceeds a yaw rate limit. In some embodiments, the systems and methods disclosed herein anticipate the LTE event based, for example, on a pedal position that will eventually cause the aircraft to exceed the yaw rate limit if the pedal position is held. This allows the flight control system to alert the pilot of the LTE risk before the yaw rate has approached the yaw rate limit.

In another example embodiment, a flight control system for a rotorcraft comprises a flight control computer configured to control operation of a tail rotor, wherein the tail rotor is configured to control yaw of the rotorcraft, and wherein the flight control computer is configured to limit a rotorcraft yaw rate based upon a current flight speed to prevent onset of a vortex ring state at the tail rotor. The flight control computer comprises a processor executing software instructions, wherein the software instructions are configured to perform the steps of determining a commanded yaw rate for the rotorcraft, determining a current forward speed and descent rate for the rotorcraft, referencing a database to determine if the commanded yaw rate or anticipated yaw rate from the command is acceptable at the current flight speed, and if the current yaw rate or anticipated yaw rate is not acceptable at the current flight speed, controlling a tail-rotor thrust to remain below a maximum yaw rate for the current flight speed.

The flight control computer may comprise a processor executing software instructions, wherein the software instructions are configured to perform the steps of receiving a yaw rate and a yaw command for the rotorcraft, determining a current speed for the rotorcraft, referencing a database to determine a maximum yaw rate acceptable at the current speed, and controlling a tail-rotor thrust to yaw the rotorcraft while remaining below the maximum yaw rate for the current speed. In other embodiments, instead of referencing a database to determine a maximum acceptable yaw rate, the flight control computer may perform a calculation based on current aircraft flight conditions and command inputs to determine if there is a risk of exceeding a yaw rate limit or a risk that the tail rotor may enter a VRS condition.

The flight control computer may comprise a processor executing software instructions, wherein the software instructions are configured to perform the steps of determining a commanded yaw rate for the rotorcraft, determining a current forward speed for the rotorcraft, referencing a database to determine if the commanded yaw rate or anticipated yaw rate from the command is acceptable at the current forward speed, and if the commanded yaw rate or anticipated yaw rate from the command is not acceptable at the current forward speed, controlling a tail-rotor thrust to keep the rotorcraft below a maximum yaw rate for the current forward speed. The database may comprise a lookup table of yaw rates for a range of forward speeds.

In other embodiments, the flight control computer may not require aircraft speed to manage the yaw rate. Instead, a single, conservative nose-right yaw rate limit may be set, wherein the selected yaw rate limit can be used for preventing LTE across all flight conditions. The flight control computer manages the aircraft to the remain under the designated yaw rate limit with appropriate tail rotor commands and restrictions, for example.

The flight control system may further comprise a pilot warning system configured to provide pilot alerts when a current rotorcraft yaw rate or anticipated yaw rate (e.g., based on pedal position, collective input, or flight condition) is within a predetermined range of a maximum safe yaw rate for a current aircraft flight speed. The predetermined range is a percentage of the maximum safe yaw rate or a predetermined value.

In an example process, a method of controlling a helicopter by a flight control system comprises monitoring a commanded yaw rate for the helicopter, monitoring a current flight speed for the helicopter, performing an assessment or data lookup to determine if a commanded pedal position or other control input will result in a yaw rate that is acceptable at the current speed, wherein the assessment or data lookup identifies the onset of a vortex ring state for the helicopter's tail rotor, if the commanded yaw rate is acceptable, turning the helicopter at the commanded yaw rate by a flight control computer, and if the commanded yaw rate is not acceptable, turning the helicopter at a maximum acceptable yaw rate for the current speed by the flight control computer. The yaw rate assessment may comprise a calculation based upon current aircraft conditions and commanded inputs instead of requiring a table look up or database query.

The method may further comprise notifying a pilot if a commanded yaw rate or anticipated yaw rate from the command presents a risk of loss of tail rotor effectiveness due to vortex ring state.

The method may further comprise notifying a pilot if a yaw rate has been limited below a commanded yaw rate value when the commanded yaw rate presents a risk of loss of tail rotor effectiveness due to vortex ring state.

The method may further comprise identifying when a current yaw rate or anticipated yaw rate of the helicopter is above a maximum acceptable value for the current speed, and automatically applying, by the flight control computer, a maximum yaw command opposite a current yaw direction. The method may further comprise determining when an updated yaw rate is below the maximum acceptable yaw rate or anticipated yaw rate for an updated current speed and reducing the yaw command opposite the current yaw direction.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
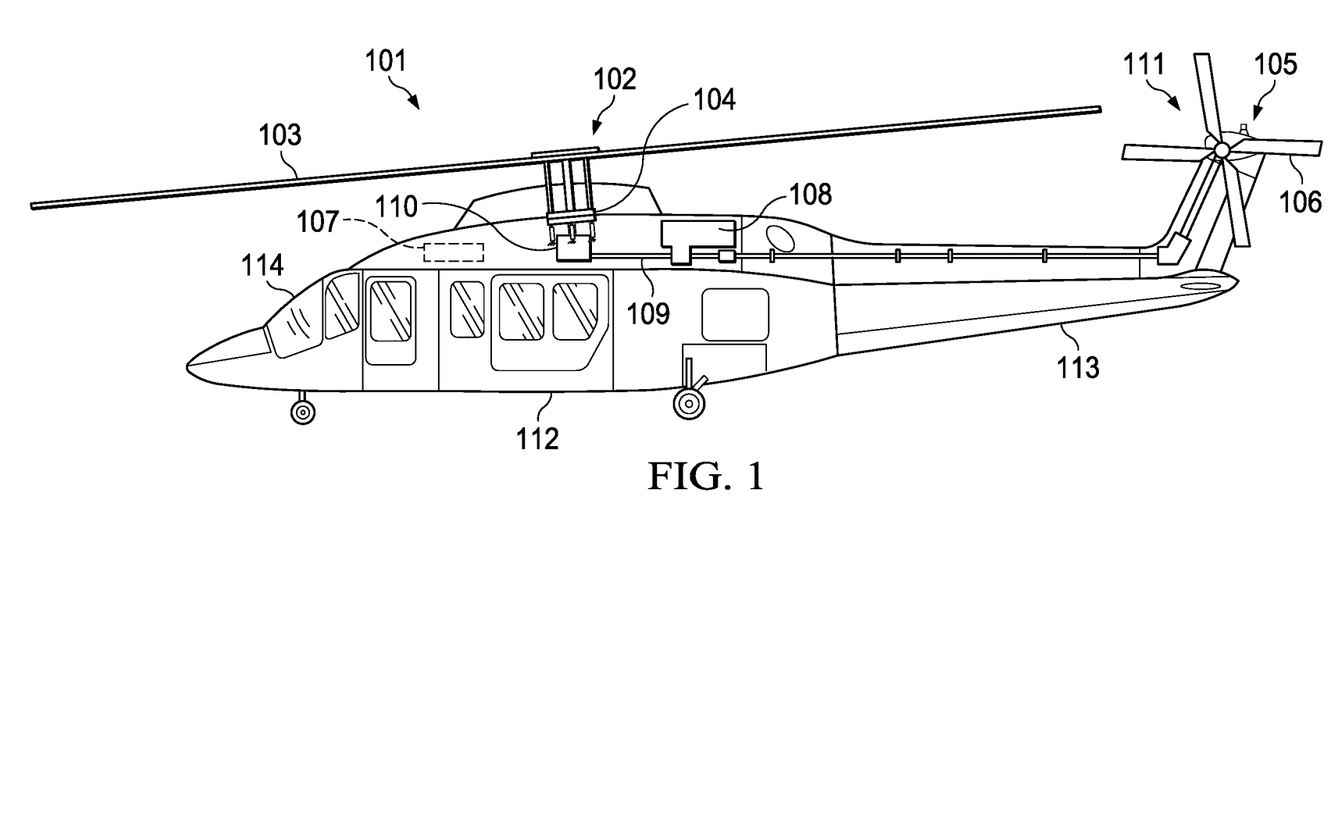
FIG. 1 illustrates a rotorcraft according to some embodiments.

FIG. 1 illustrates a rotorcraft 101 according to some embodiments. The rotorcraft 101 has a main rotor system 102, which includes a plurality of main rotor blades 103. The pitch of each main rotor blade 103 may be controlled by a swashplate 104 in order to selectively control the attitude, altitude, and movement of the rotorcraft 101. The swashplate 104 may be used to collectively and/or cyclically change the pitch of the main rotor blades 103. The rotorcraft 101 also has an anti-torque system, which may include a tail rotor 105, no-tail-rotor (NOTAR), or dual main rotor system. In rotorcraft with a tail rotor 105, the pitch of each tail rotor blade 106 is collectively changed in order to vary thrust of the anti-torque system, providing directional control of the rotorcraft 101. The pitch of the tail rotor blades 106 is changed by one or more tail rotor actuators. In some embodiments, a fly-by-wire (FBW) system 107 sends electrical signals to the tail rotor actuators or main rotor actuators to control flight of the rotorcraft. The FBW system assists pilots in stably flying rotorcraft 101 and to reduce workload on the pilots.

Power is supplied to the main rotor system 102 and the anti-torque system 105 by engines 108. There may be one or more engines 108, which may be controlled according to signals from the FBW system 107. The output of the engine 108 is provided to a driveshaft 109, which is mechanically and operatively coupled to the main rotor system 102 and the anti-torque system 105 through a main rotor transmission 110 and a tail rotor transmission 111, respectively.

The rotorcraft 101 further includes a fuselage 112 and tail section 113. The tail section 113 may have other flight control devices such as horizontal or vertical stabilizers, rudder, elevators, or other control or stabilizing surfaces that are used to control or stabilize flight of the rotorcraft 101. The fuselage 112 includes a cockpit 114, which includes displays, flight controls (e.g., cyclic, collective, pedals, etc.), and instruments. It should be appreciated that even though rotorcraft 101 is depicted as having certain illustrated features, the rotorcraft 101 may have a variety of implementation-specific configurations. For instance, in some embodiments, cockpit 114 is configured to accommodate a pilot or a pilot and co-pilot, as illustrated. It is also contemplated, however, that rotorcraft 101 may be operated remotely, in which case the cockpit 114 could be configured as a fully functioning cockpit to accommodate a pilot/co-pilot or may have limited functionality to provide controls for a back-up pilot with the primary piloting functions being performed remotely. In yet other contemplated embodiments, rotorcraft 101 could be configured as an unmanned vehicle, in which case the cockpit 114 could be eliminated entirely in order to save space and cost.

The FBW system 107 may provide different control characteristics or responses for cyclic, pedal, or collective control input in the different flight regimes. FBW system 107 may be implemented in one or more flight control computers (FCCs) disposed between pilot controls in cockpit 114 and flight control systems. The FCCs provide corrections to flight controls that assist in operating the rotorcraft more efficiently or that put the rotorcraft into a stable flight. The FBW systems in rotorcraft 101 may, for example, automatically adjust power output by the engine to match a collective control input, apply collective or power correction during a cyclic control input, provide automation of one or more flight control procedures, provide for default or suggested control positioning, or the like.

In some embodiments, the FBW system 107 includes an autopilot function that provides automatic flight control for rotorcraft 101. The autopilot may be capable of controlling some or all aircraft flight parameters, such as maintaining speed, velocity, heading, or altitude, or managing operations, such as hovering and navigating. The autopilot can relieve a pilot of time-intensive tasks and reduce the pilot's workload. The autopilot system provides flight commands to a flight control computer. The flight control computer interprets the flight commands and, in response to the autopilot's commands, signals actuators that control the main rotor system 102 and the anti-torque system 105 as well as the angle of attack of main rotor blades 103 and tail rotor blades 106. Such actuators may be mechanically, electrically, pneumatically, and/or hydraulically driven and may be controlled by electrical command signals from the flight control computer.

Figure 2:
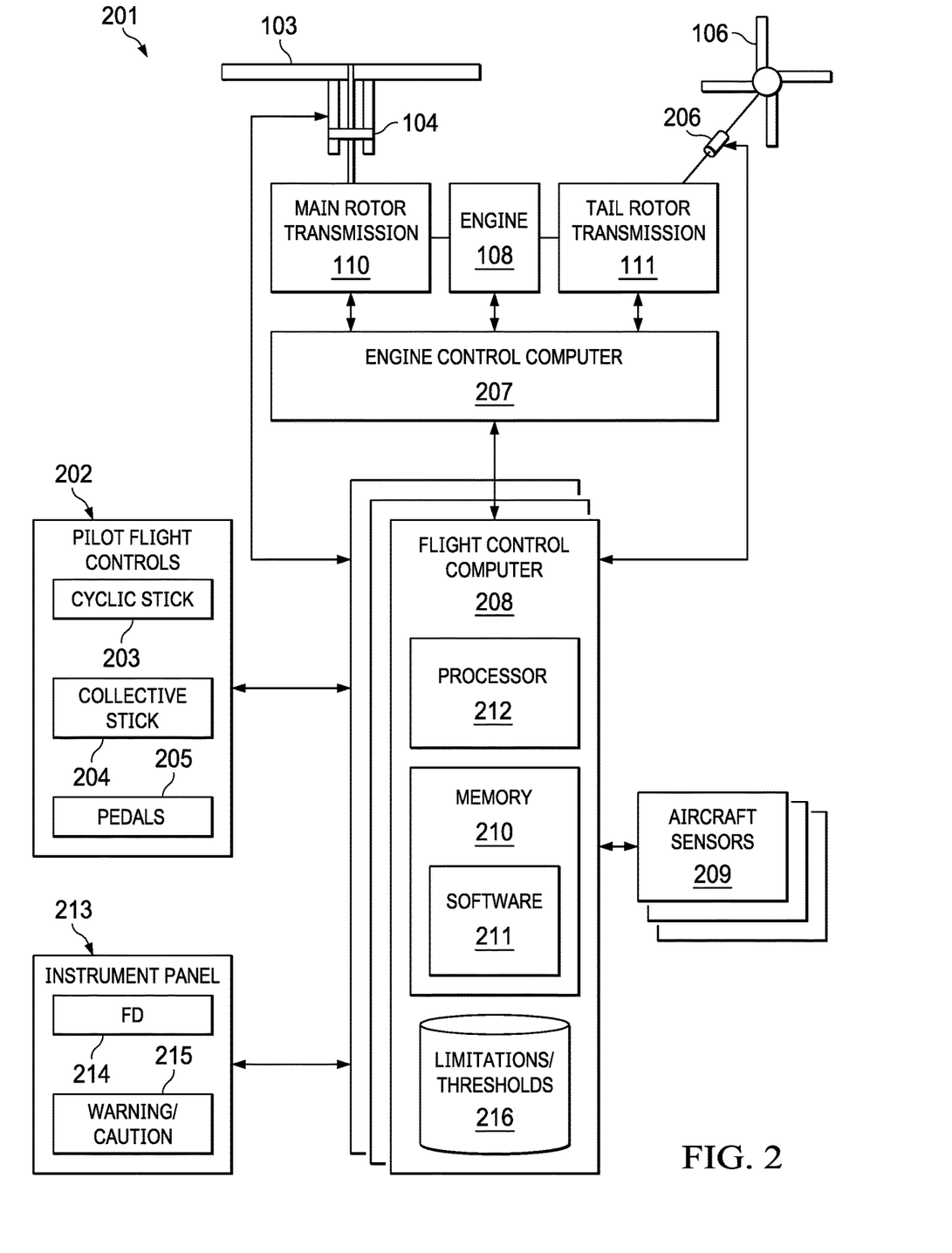
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls 202 in order to control flight of the rotorcraft. The pilot flight controls 202 may include manual controls such as a cyclic stick 203, a collective stick 204, and pedals 205. Inputs provided by the pilot to the pilot flight controls 202 may be transmitted mechanically and/or electronically (e.g., via the FBW flight control system) to flight control elements by the flight control system 201. Flight control elements may represent devices operable to change the flight characteristics of the rotorcraft. Flight control elements on the rotorcraft may include mechanical and/or electrical systems operable to change the positions or angle of attack of the main rotor blades 103 and the tail rotor blades 106 or to change the power output of the engines 108, for example. Flight control elements include systems such as the swashplate 104, tail rotor actuator 206, and systems operable to control the engines 108. The flight control system 201 may adjust the flight control elements independently of the flight crew in order to stabilize the rotorcraft, reduce workload of the flight crew, and the like. The flight control system 201 includes engine control computers (ECCUs) 207, flight control computers (FCCs) 208, and aircraft sensors 209, which collectively adjust the flight control elements.

The flight control system 201 has one or more FCCs 208. In some embodiments, multiple FCCs 208 are provided for redundancy. One or more modules within the FCCs 208 may be partially or wholly embodied as software and/or hardware for performing any functionality described herein. For example, FCCs 208 may comprise a memory 210, including a non-transitory medium for storing software 211, and one or more processors 212 for executing instructions of software 211. Memory 210 in some embodiments is a memory system that includes both transitory memory such as RAM and non-transitory memory such as, ROM, EEPROM, Flash-EEPROM, magnetic media including disk drives, and optical media. Memory 210 stores software 211 as machine readable instructions executable by processor 212.

In embodiments where the flight control system 201 is an FBW flight control system, the FCCs 208 may analyze pilot inputs and dispatch corresponding commands to flight control elements such as the ECCUs 207, the tail rotor actuator 206, actuators for the swashplate 104, or other components used to control operation of the rotorcraft. Further, the FCCs 208 are configured and receive input commands from the pilot controls 202 through sensors associated with each of the pilot flight controls. The input commands are received by measuring the positions of the pilot controls 202. The FCCs 208 also control tactile cueing commands to the pilot controls 202 or display information in instruments on, for example, an instrument panel 213.

In some embodiments, the instrument panel 213 includes a flight management system (FMS). The FMS may include a GPS, a mapping system, a navigation system, or other types of systems. A flight director system ("FD") 214 may further include a display that can be used to provide information to the pilot. In some embodiments, the FD 214 may be configured to send signals representing flight control targets to the FCCs 208, and may be configured to receive coupling logic signals from the FCCs 208. The FD 214 and FCCs 208 may be able to send or receive other signals, such as sensor signals, target error signals, command signals, or other types of signals. In some embodiments, the FD 214 is communicatively coupled to the FCCs by a communications bus such as a serial bus, a CAN bus, or another type of wired or wireless communication system. In some embodiments, the FD 214 includes an autopilot function that provides automatic flight control for the aircraft.

The ECCUs 207 control the engines 108. For example, the ECCUs 207 may vary the output power of the engines 108 to control the rotational speed of the main rotor blades or the tail rotor blades. The ECCUs 207 may control the output power of the engines 108 according to commands from the FCCs 208, or may do so based on feedback such a measured revolutions per minute (RPM) of the main rotor blades.

The aircraft sensors 209 are in communication with the FCCs 208. The aircraft sensors 209 may include sensors for measuring a variety of rotorcraft systems, flight parameters, environmental conditions, and the like. For example, the aircraft sensors 209 may include sensors for measuring yaw rate, ground speed, airspeed, altitude, attitude, position, orientation, temperature, airspeed, vertical speed, and the like. Other aircraft sensors 209 could include sensors relying upon data or signals originating external to the rotorcraft, such as a global positioning system (GPS) sensor, a VHF Omnidirectional Range sensor, Instrument Landing System (ILS), and the like. In some cases, some aircraft sensors 209 are part of or connected to the FD 214.

The cyclic stick 203 may be connected to one or more cyclic position sensors, one or more cyclic detent sensors, and one or more cyclic actuators or cyclic trim motors. The cyclic position sensors measure the position of the cyclic stick 203. In some embodiments, the cyclic stick 203 is a single control stick that moves along two axes and permits a pilot to control pitch, which is the vertical angle of the nose of the rotorcraft and roll, which is the side-to-side angle of the rotorcraft. The cyclic position sensors generate roll and pitch signals that are sent to the FCCs 208, which controls the swashplate 104, engines 108, tail rotor 106, or related flight control devices.

The collective stick 204 has one or more collective position sensors, one or more collective detent sensors, and one or more collective actuators or collective trim motors. The collective position sensors measure the position of a collective stick 204. In some embodiments, the collective stick 204 is a single control stick that moves along a single axis or with a lever type action. A collective position sensor detects the position of the collective stick 204 and sends a collective position signal to the FCCs 208, which controls engines 108, swashplate actuators 104, or related flight control devices according to a collective position signal to control the vertical movement of the rotorcraft. In some embodiments, the FCCs 208 may send a power command signal to the ECCUs 207 and a collective command signal to the main rotor 103 or swashplate actuators 104 so that the angle of attack of the main blades is raised or lowered collectively, and the engine power is set to provide the needed power to keep the main rotor RPM substantially constant.

Pedals 205 have one or more pedal sensors that detect the position of the pedals 205 and sends a pedal position signal to the FCCs 208, which controls the tail rotor blades 106 to cause the rotorcraft to yaw or rotate around a vertical axis.

Instrument panel 213 may provide warning, caution, and advisory indications 215 to the pilot. Warning and caution indications 213 may include, for example, text alerts on a display, lights (e.g., master caution and fire lights), an annunciator panel, aural warnings (e.g., bells, chimes, and tones), spoken warnings, tactile feedback (e.g., cyclic, collective, or pedal shaker), and other indicators. FCCs 208 may determine that the aircraft is approaching or in an unsafe condition and may trigger an appropriate warning or caution indicator 215 to notify the pilot of that condition. For example, FCCs 208 may monitor a database of certain aircraft performance limitations and thresholds 216. When an aircraft status or flight condition reaches or approaches a limitation or threshold in database 216, FCCs 208 can provide an indication to the pilot via warnings and cautions 215.

LTE is a well-known phenomenon of single main rotor helicopters. A helicopter may not recover from an LTE condition if the pilot allows excess yaw rate to develop and does not counter it immediately. In a helicopter with a FBW flight control system, LTE can be mitigated by limiting the associated yaw rate. In prior FBW systems, there has been no criteria to set such yaw rate limitations to prevent LTE. The embodiments disclosed herein use recent LTE knowledge and incorporate an algorithm into the helicopter flight control system to limit the pilot's ability to achieve yaw rates that would cause LTE under various flight conditions and aircraft states. In some embodiments, the aircraft may be under computer control versus pilot control. In either case, the main strategy employed by the disclosed embodiments is to prevent the aircraft from getting to a yaw rate that initiates VRS.

Figure 3A:
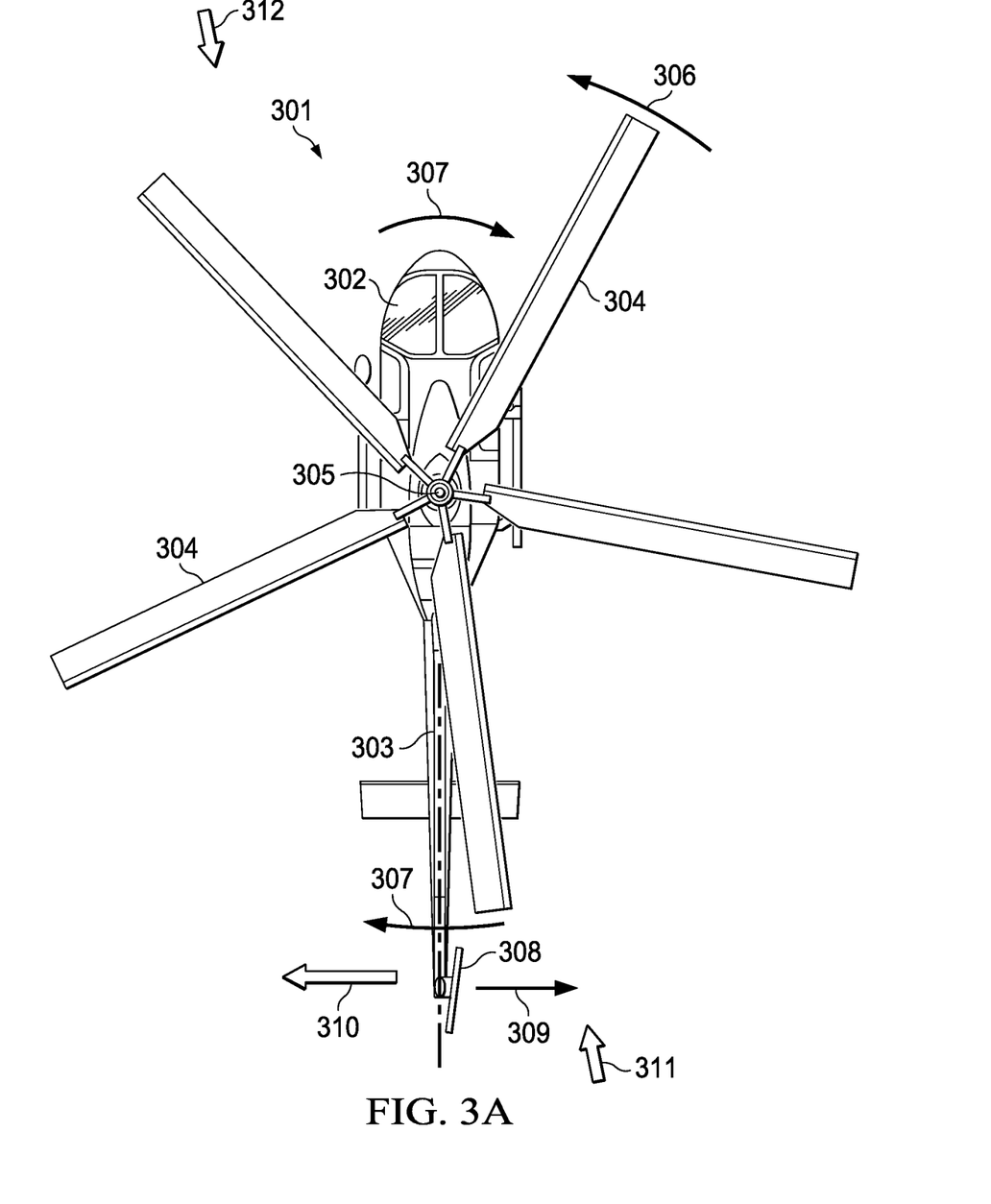
FIG. 3A is a top view of a helicopter according to some embodiments.

FIG. 3A is a top view of a helicopter 301 having a fuselage 302 and an empennage 303. A main rotor having a plurality of rotor blades 304 is mounted on fuselage 302 by mast 305. Main rotor blades 304 rotate in a counterclockwise direction around mast 305 as indicated by arrow 306. Engine torque is applied to rotate the main rotor blades 304 generating an equal and opposite torque on fuselage 302 as indicated by arrow 307. Torque 307 induces a right yaw force on helicopter 301. An anti-torque system, such as tail rotor 308, is mounted at the end of empennage 303. Tail rotor 308 generates a tail rotor thrust 309 to counteract torque 307 so that helicopter 301 can maintain directional control. Tail rotor 308 creates a wake 310 that is blown to the left side of helicopter 301. While FIG. 3A illustrates a helicopter having a main rotor that rotates in a counterclockwise direction, it will be understood that the same phenomena occur in helicopters having a main rotor that rotates in a clockwise direction, but the forces and torques are reversed compared to FIG. 3A.

LTE may occur in helicopter 301 under several different conditions. In some cases, tailwinds can accelerate right yaw rates and make a right turn susceptible to LTE. For example, a tailwind 311 from the right rear quarter will have the tendency to "weathervane" helicopter 301 and create forces on empennage 303 that work to turn helicopter 301 into the wind. In other cases, headwinds may create main rotor disc vortex interference the reduces the effectiveness of tail rotor blades 308. For example, a left quartering headwind 312 can direct the main rotor vortex onto the tail rotor, which reduces the angle of attack for tail rotor blades 308, thereby reducing the anti-torque thrust 309 and creating right yaw. The pilot must maintain control of helicopter 301 and detect any uncommanded right yaw caused by tailwinds 311 headwinds 312, or other external conditions. Pursuant to the FAA Advisory Circular, if a sudden uncommand right yaw is detected, the pilot should apply full left pedal and move the cyclic forward to increase speed until recovery is detected.

Figure 3B:
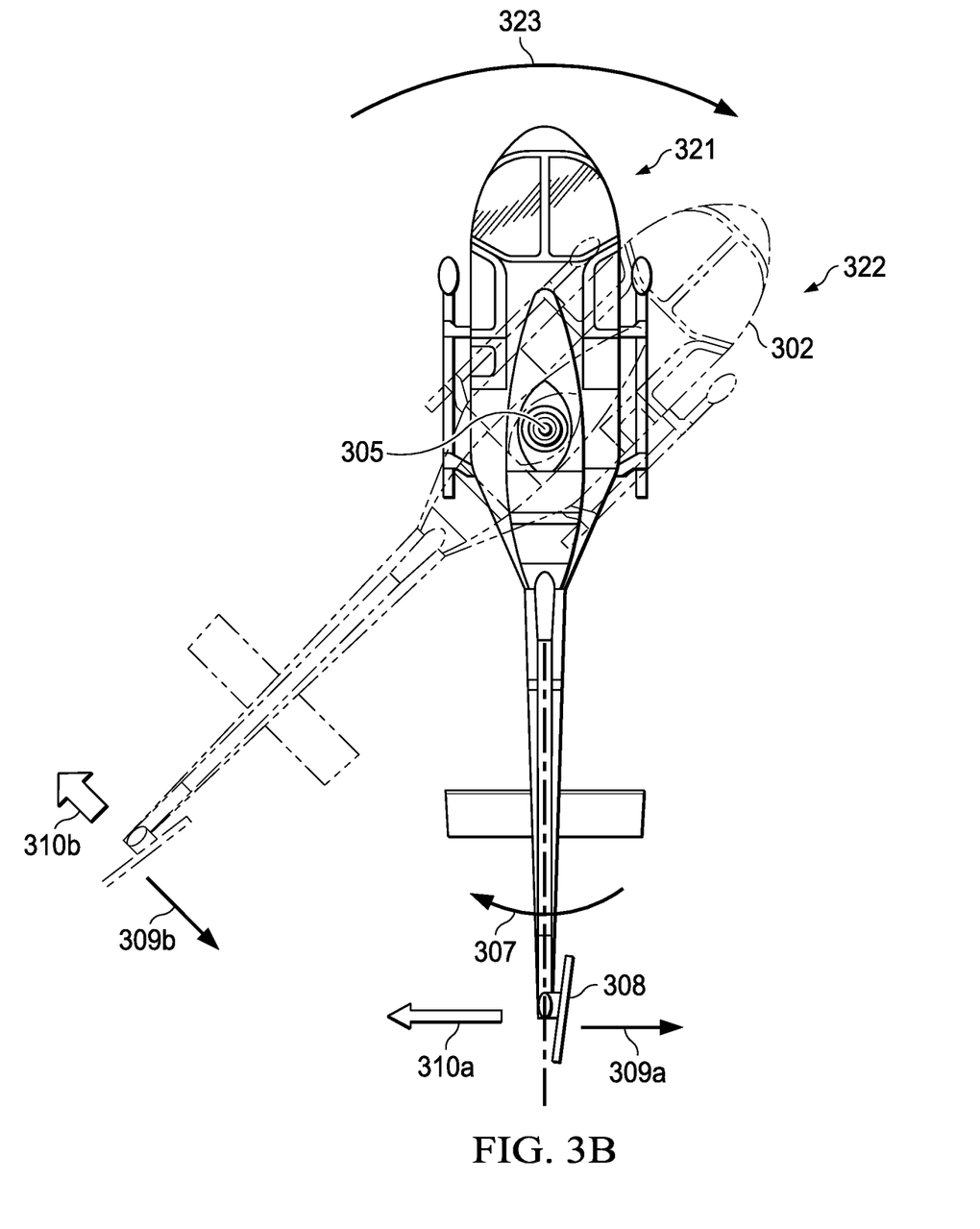
FIG. 3B is a top view depicting the helicopter of FIG. 3A in a right turn and showing an initial position superimposed by a subsequent position.

FIG. 3B is a top view depicting helicopter 301 in a right turn and showing an initial position 321 superimposed by a subsequent position 322. Main rotor blades 304 are not shown in FIG. 3B to simplify the drawing. In some cases, commanded right turns at high yaw rates may cause LTE. The pilot initiates the right turn by stepping on the right pedal thereby inducing right yaw so that helicopter fuselage 302 begins to rotate clockwise 323 around mast 305. When the pilot starts the right turn, the initial thrust value 309a created by tail rotor blades 308 is reduced to a lower, or negative, thrust value 309b. Low or negative tail rotor thrust, combined with torque 307 yaw the helicopter fuselage 302 to the right. The resulting yaw rate may drive tail rotor blades 308 into the tail rotor's wake 310a, which can build-up during the turn. As a result, the tail rotor wake cannot get away from the tail rotor. Eventually, the tail rotor's wake 310b can accumulate with sufficient intensity that the tail rotor is placed into a vortex ring state (VRS) condition. Once the tail rotor enters the VRS condition, the tail rotor blades 308 are immersed in a powerful flow field induced by the tail rotor's accumulated wake. The induced flow field prevents the tail rotor blades from increasing their effective angle of attack, even if the pilot attempts to increase tail rotor thrust. Thus, the helicopter remains in a spin. The tail rotor enters an equilibrium condition wherein it is unable to increase its thrust to a level that would reverse the helicopter's right turn rate, and then helicopter 301 is in LTE and will continue to yaw right uncommanded.

This is a pilot-induced LTE that occurs when the commanded yaw rate is sufficient to create the VRS condition on the tail rotor. The ability for this to occur depends upon, at least, the helicopter's commanded yaw rate and the flight speed. The helicopter is at more risk of LTE due to the tail-rotor-VRS condition at hover or low speeds. Once the helicopter's flight speed increases, the potential for developing an accumulated tail rotor wake is reduced along with the VRS condition.

Figure 4:
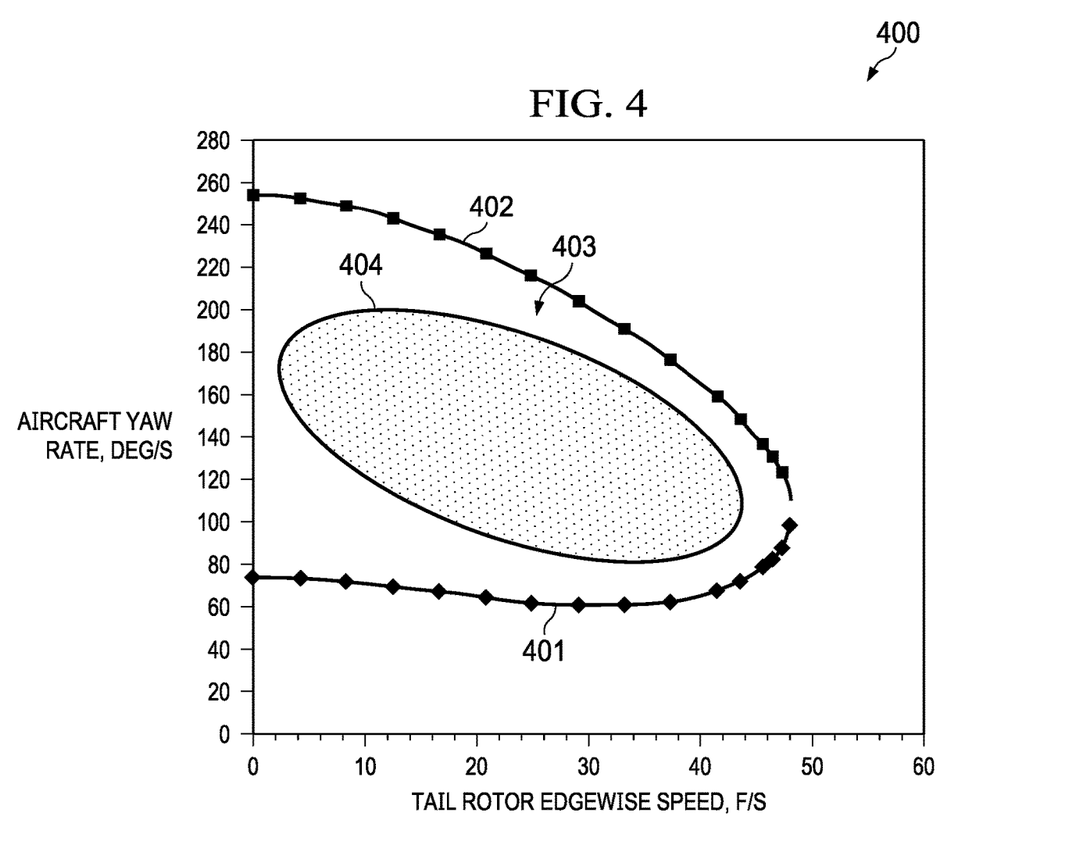
FIG. 4 is a graph illustrating an example LTE VRS envelope in terms of helicopter yaw rate.

FIG. 4 is a graph 400 illustrating an example LTE VRS envelope in terms of helicopter yaw rate. Having identified the cause of sustained LTE as VRS that is induced by a high yaw rate, the yaw rates that induce VRS on the tail rotor can be predicted as shown in FIG. 4. The x-axis represents the tail-rotor's edgewise flight speed in feet per second, and the y-axis represents the helicopter's yaw rate in degrees per second. Curves 401 and 402 define the boundaries of the tail rotor's VRS LTE envelope 403. When the tail rotor is operating within envelope 403, its wake is prone to accumulate, and the tail rotor may enter VRS LTE and continue an uncommanded right yaw. Curves 401 and 402 represent the yaw rate limits for the onset of tail-rotor VRS.

Once the tail rotor is in the VRS condition, applying full left pedal may not produce sufficient additional thrust to overcome the uncommanded right yaw. Accordingly, the pilot should avoid conditions that are conducive to LTE; however, the pilot may unintentionally induce tail rotor VRS (i.e., commanding sufficient right yaw rate to enter envelope 403) while performing operations, such as a rapid right turn in hover.

In one embodiment, knowledge of the LTE envelope 403 is incorporated as an algorithm in the helicopter's flight control system, which in turn limits the pilot's ability to achieve yaw rates that would cause LTE under the helicopter's current flight conditions. For example, a specific yaw rate limit can be set in the helicopter's flight control computers to avoid LTE based on VRS avoidance. By incorporating the specified LTE yaw rate limits into an algorithm (211) within the helicopter's FBW control system, the FCCs can alert the pilot to a pending VRS LTE based upon the current helicopter yaw rate and the pilot's pedal input. If the algorithm anticipates that VRS LTE limits will be exceeded, the system can respond with alerts such as spoken, aural, visual, or tactile warnings. The helicopter's FBW system may also prevent the pilot from exceeding the limit by directly acting upon the pedal input to prevent VRS LTE. The FCCs may also apply aircraft limits to pilot-commanded control inputs so that FBW commands to the main rotor blade, tail rotor blade, and control surface actuators are filtered or limited, based on the current operating conditions, in order to prevent the development of yaw rates that may induce tail rotor VRS.

Referring to FIG. 2, in one embodiment, a limitations and thresholds database 216 may include a table comprising yaw rate limitation data representative of graph 400. Aircraft sensors 209 may include a yaw rate sensor. Alternatively, aircraft sensors 209 may provide other aircraft data, such as heading, that allows FCC 208 to calculate a yaw rate. FCC 208 may continuously monitor the aircraft's current yaw rate and compare the yaw rate to yaw rate limitation data in database 216. If the aircraft's yaw rate is approaching, is at, or is above an excluded yaw rate (e.g., relative to curves 401, 402 and envelope 403), then FCC 208 may provide a warning to the pilot via warning/caution indicators 215.

The FCC 208 may also monitor pilot inputs, such as yaw inputs commanded via pedals 205. FCC 208 may calculate an estimated yaw rate for the aircraft based upon the pedal 208 input commands. If it is anticipated that the aircraft will reach or exceed yaw rate limits in database 216, then FCCs 208 may limit or reverse commands to tail rotor actuator 206 to prevent tail rotor 106 from reaching a VRS condition and thereby prevent the aircraft from experiencing LTE. FCC 208 may also monitor current or anticipated yaw rates initiated by other command inputs, such as a main rotor collective input, in addition to pedal commands. Additionally, FCC 208 may limit or reverse commands to other actuators, such as a main rotor actuator, to prevent tail rotor 106 from reaching a VRS condition.

In another embodiment, an FBW system may attempt to recover the aircraft from a VRS-induced LTE condition. For example, FIG. 4 may define a region 404 that is within the VRS LTE envelope 403. Region 404 may represent flight conditions for which the FBW system will attempt to recover from VRS LTE. When the FBW system determines that the aircraft is approaching or is within envelope 403, the FCCs may limit or restrict actuator commands to prevent the onset of, or further entry into, the VRS condition. In one example, a recovery of tail rotor VRS may be attempted by maneuvering the helicopter with a pitch or roll or by descending or climbing. Altitude permitting, another approach would involve a command to reduce the collective pitch of the main rotor blades. The reduction of main rotor collective relieves the tail rotor of the need to produce anti-torque thrust, allowing the tail rotor to recover from the VRS condition. Once the aircraft is operating within the VRS LTE region 403, the pilot should execute appropriate recovery procedures. If the pilot's recovery is not initiated or is not effective, the aircraft may move "deeper" into the VRS LTE region, such as experiencing increasing unintentional/uncommanded yaw rate, and the flight conditions may reach region 404. At that time, the FBW system may automatically execute non-intuitive LTE recovery procedure, such as commanding full right pedal followed by an abrupt full left pedal input regardless of pilot input to the pedals. The latter maneuver can allow the tail rotor to distance itself from its accumulated vortex wake by executing (temporarily) an even higher yaw rate. Once the tail rotor has cleared its wake it is able to get positive thrust that can reverse the yaw direction for a recovery. The FBW system may notify the pilot when such automatic procedures are being executed, such as by illuminating a warning or caution light, or providing some other spoken, aural, or tactile warning. The FBW system may provide an input for the pilot to deselect or override the automatic recovery procedures, such as a switch, button, trigger, or paddle on the cyclic or collective. If automatically initiated, the FBW recovery procedures may be executed until the aircraft flight conditions exit VRS LTE envelope 403 and normal flight is restored.

In certain flight conditions the helicopter's flight control computer or pitot static system may have difficulty getting an accurate airspeed measurement, such as during operations at low speeds when the rotor outwash may create misleading readings. In some embodiments, the flight control computer may manage yaw rates without reference to the helicopter's speed. For example, the flight control computer may establish a single yaw rate limit without regard to flight speed. Alternatively, the flight control computer may establish a single yaw rate limit for a block of flight speeds, such as all speeds under a threshold speed. The threshold speed may be associated with a minimum level of confidence in the measured airspeed. Above the threshold airspeed, the flight control computer may either calculate yaw rate limits or use a database to determine the yaw rate limits. Alternatively, yaw rate limits may be assigned all airspeeds or for blocks of airspeeds.

LTE is a low speed phenomenon. In certain flight conditions, particularly at higher speeds, it is difficult for a helicopter to enter LTE because the tail rotor moves away from the wake and, therefore, the wake cannot accumulate to create a VRS condition. Accordingly, the flight control computer may establish a single yaw rate limit for a block of flight speeds, such as all speeds above a designated speed, wherein the designated speed is associated with a minimum risk of LTE.

In an example embodiment, a flight control system for a helicopter comprises a pilot interface configured to receive a control input, at least one electronically controlled actuator, at least one yaw rate sensor, and a computing device configured to translate the control input to an actuator command, wherein the computing device is further configured to apply limits to the actuator command to prevent excessive aircraft yaw rate to avoid loss of tail rotor effectiveness. The yaw rate limits are associated with a VRS envelope for a tail rotor of the helicopter. The electronically controlled actuator may be, for example, a tail rotor actuator or a main rotor actuator. The control input may be, for example, a pedal input or a main rotor collective input.

The flight control system may further comprise a memory device configured to store the yaw rate limits as a table indicating whether a set of yaw rates are acceptable across a set of flight speeds.

The computing device may be further configured to apply an algorithm to calculate yaw rate limits and to determine whether the control input will lead to yaw rates that are acceptable for avoiding LTE.

The flight control system may comprise an indicator configured to notify the pilot when a current helicopter yaw rate or a commanded helicopter yaw rate exceeds a yaw rate limit.

In another example embodiment, a flight control system for a rotorcraft comprises a flight control computer configured to control operation of a tail rotor, wherein the tail rotor is configured to control rotorcraft heading, and wherein the flight control computer is configured to limit a rotorcraft yaw rate to prevent loss of tail rotor effectiveness (LTE). The flight control computer may comprise a processor executing software instructions, and wherein the software instructions are configured to perform the steps of determining a commanded yaw rate for the rotorcraft, determining if the commanded yaw rate is acceptable for avoiding LTE, and if the current yaw rate is not acceptable, controlling a tail-rotor thrust to remain below a maximum yaw rate.

The step of determining if the commanded yaw rate is acceptable for avoiding LTE may comprise comparing the commanded yaw rate to a yaw rate limit applied across the rotorcraft's entire flight envelope.

The step of determining if the commanded yaw rate is acceptable for avoiding LTE may comprise applying an algorithm to determine a maximum acceptable yaw rate. The algorithm may calculate acceptable yaw rates based on one or more parameters selected from: tail rotor thrust, main rotor torque, altitude, gross weight, air density, and temperature.

The step of determining if the commanded yaw rate is acceptable for avoiding LTE may comprise referencing a database to determine if the commanded yaw rate is acceptable at the rotorcraft's current speed. The database may comprise a lookup table of yaw rates for a range of forward speeds, altitudes, gross weights, air densities, or temperatures.

The flight control system may comprise a pilot warning system configured to provide pilot alerts when a current rotorcraft yaw rate or commanded yaw rate is predicted to exceed the maximum safe yaw rate.

In a further example embodiment, a method of controlling a helicopter by a flight control system comprises monitoring a commanded yaw rate for the helicopter, performing a calculation to determine if the commanded yaw rate is acceptable for avoiding the onset of vortex ring state (VRS) on the tail rotor, if the commanded yaw rate is acceptable, turning the helicopter at the commanded yaw rate by a flight control computer, and if the commanded yaw rate is not acceptable, turning the helicopter at a maximum acceptable yaw rate by the flight control computer.

The method may further comprise identifying when a current yaw rate of the helicopter exceeds a maximum acceptable yaw rate; and automatically applying, by the flight control computer, a control strategy for recovering the tail rotor authority.

The method may further comprise determining that the helicopter tail rotor is experiencing loss of tail rotor effectiveness (LTE) due to the tail rotor being in a VRS condition; and providing a pilot with an option to initiate, by the flight control computer, an automatic control strategy to bring the tail rotor out of VRS and to recover control.

The method may further comprise determining when an updated yaw rate is below the maximum acceptable yaw rate; and restoring control of the tail rotor to the pilot.

The example embodiments described herein refer to a flight control computer, which is intended to be broadly interpreted to mean any processor-based system that actuates flight control surfaces, such as a vehicle management system (VMC) or other system that links the aircraft's computers and networks, manages the aircraft's avionics and flight controls, supports high-speed communications, and/or enables fly-by-wire and autonomous flight capabilities.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A flight control system for a helicopter, comprising:
a pilot interface configured to receive a control input;
at least one electronically controlled actuator;
at least one yaw rate sensor; and
a computing device configured to:
translate the control input to an actuator command;
apply one of a plurality of first predicted yaw rate limits to the actuator command to prevent excessive aircraft yaw rate to avoid loss of tail rotor effectiveness, wherein the plurality of yaw rate limits are associated with a vortex ring state (VRS) envelope for a tail rotor of the helicopter; and
apply one of a plurality of second predicted yaw rate limits to the actuator command to prevent the excessive aircraft yaw rate to avoid loss of tail rotor effectiveness, wherein the second predicted yaw rate limits are different than the first predicted yaw rate limits.

2. The flight control system of claim 1, wherein the at least one electronically controlled actuator comprises a tail rotor actuator or a main rotor actuator.

3. The flight control system of claim 1, wherein the control input is a pedal input or a main rotor collective input.

4. The flight control system of claim 1, further comprising:
a memory device configured to store the first and second predicted yaw rate limits as a table indicating whether a set of yaw rates are acceptable across a set of speeds.

5. The flight control system of claim 1, wherein the computing device is further configured to apply an algorithm to calculate the first or second yaw rate limits and to determine whether the control input will lead to yaw rates that are acceptable for avoiding the LTE.

6. The flight control system of claim 1, further comprising:
an indicator configured to notify the pilot when a current helicopter yaw rate exceeds one of the predicted first or second yaw rate limits, or the control input is anticipated to result in a yaw rate that exceeds one of the predicted first or second yaw rate limits.

7. A flight control system for a rotorcraft, comprising:
a flight control computer configured to control operation of a tail rotor, wherein the tail rotor is configured to control rotorcraft heading, wherein the flight control computer is configured to apply one of a plurality of first predicted yaw rate limits to limit a rotorcraft yaw rate to prevent loss of tail rotor effectiveness (LTE), wherein the plurality of yaw rate limits are associated with a vortex ring state (VRS) envelope for a tail rotor of the helicopter, and wherein the flight control computer is configured to apply one of a plurality of second predicted yaw rate limits to limit the rotorcraft yaw rate to prevent loss of the LTE, wherein the second predicted yaw rate limits are different than the first predicted yaw rate limits.

8. The flight control system of claim 7, wherein the flight control computer comprises a processor executing software instructions, and wherein the software instructions are configured to perform the steps of:
determining a commanded yaw rate for the rotorcraft;
determining if the commanded yaw rate is acceptable for avoiding the LTE; and
when the current yaw rate is not acceptable, controlling a tail-rotor thrust to remain below a maximum yaw rate.

9. The flight control system of claim 8, wherein determining if the commanded yaw rate is acceptable for avoiding LTE comprises:
comparing the commanded yaw rate to the first or second predicted yaw rate limit for rotorcraft's flight envelope.

10. The flight control system of claim 8, wherein determining if the commanded yaw rate is acceptable for avoiding LTE comprises:
applying an algorithm to determine the acceptable yaw rate.

11. The flight control system of claim 10, wherein the algorithm calculates acceptable yaw rates based on one or more parameters selected from: tail rotor thrust or torque, main rotor torque, altitude, gross weight, air density, and temperature.

12. The flight control system of claim 8, wherein determining if the commanded yaw rate is acceptable for avoiding LTE comprises:
referencing a database to determine if the commanded yaw rate is acceptable at the rotorcraft's current speed.

13. The flight control system of claim 12, wherein the database comprises a lookup table of yaw rates for a range of forward speeds, altitudes, gross weights, air densities, or temperatures.

14. The flight control system of claim 7, further comprising:
a pilot warning system configured to provide pilot alerts when a current rotorcraft yaw rate or commanded yaw rate is predicted to exceed a safe yaw rate.

15. A method of controlling a helicopter by a flight control system, comprising:
monitoring a commanded yaw rate for the helicopter;
determining, according to one of a plurality of first predicted yaw rate limits, if the commanded yaw rate is acceptable at a first level of criticality for avoiding the onset of vortex ring state (VRS) on the tail rotor, wherein the plurality of yaw rate limits are associated with a vortex ring state (VRS) envelope for a tail rotor of the helicopter;
determining, according to one of a plurality of second predicted yaw rate limits, if the commanded yaw rate is acceptable at a second level of criticality for avoiding the onset of vortex ring state (VRS) on the tail rotor, wherein the second predicted yaw rate limits are different than the first predicted yaw rate limits;
when the commanded yaw rate is acceptable, turning the helicopter at the commanded yaw rate by a flight control computer; and
when the commanded yaw rate is not acceptable, adjusting the commanded yaw rate by the flight control computer so that the yaw rate of the helicopter is acceptable.

16. The method of claim 15, further comprising:
identifying when a current yaw rate of the helicopter exceeds a maximum acceptable yaw rate; and
automatically applying, by the flight control computer, a control strategy for recovering the tail rotor authority.

17. The method of claim 15, further comprising:
determining that the helicopter tail rotor is experiencing loss of tail rotor effectiveness (LTE) due to the tail rotor being in a VRS condition; and
providing a pilot with an option to initiate, by the flight control computer, an automatic control strategy to bring the tail rotor out of VRS and to recover control.

18. The method of claim 17, further comprising:
determining when an updated yaw rate is acceptable; and
restoring control of the tail rotor to the pilot according to the determination.

* * * * *